United States Patent [19]
Perrone

[11] Patent Number: 6,157,705
[45] Date of Patent: Dec. 5, 2000

[54] VOICE CONTROL OF A SERVER

[75] Inventor: Jeffrey Perrone, San Francisco, Calif.

[73] Assignee: **E*Trade Group, Inc.**, Palo Alto, Calif.

[21] Appl. No.: 08/985,565

[22] Filed: Dec. 5, 1997

[51] Int. Cl.[7] ..................................................... H04M 1/64
[52] U.S. Cl. ...................................... 379/88.01; 704/2.84
[58] Field of Search ............................. 379/88.01, 88.02, 379/88.04, 88.17, 88.13; 705/36, 37, 39, 44

[56] References Cited

U.S. PATENT DOCUMENTS

| | | | |
|---|---|---|---|
| 5,799,063 | 8/1998 | Krane | 379/88.17 |
| 5,802,526 | 9/1998 | Fawcett et al. | 379/88.17 |
| 5,884,262 | 3/1999 | Wise et al. | 379/88.01 |
| 5,915,001 | 6/1999 | Uppaluru | 379/88.17 |

*Primary Examiner*—Scott L. Weaver
*Attorney, Agent, or Firm*—Hickman Palermo Truong & Becker LLP; Christopher J. Palermo; Edward A. Becker

[57] ABSTRACT

A method for controlling a server using voice is disclosed. In one embodiment, a client such as a Web browser is coupled over a data communication channel to a server. A telephone at the client side is connected to an interactive voice response (IVR) system that has a speech recognizer at the server side, over a separate, parallel voice communication channel. The IVR system has a control connection to the server. A table of associations between resource identifiers and network addresses is stored in association with the IVR system. A user at the client side establishes a data connection between the client and the server, and a voice connection between the telephone and the IVR system. Control software on the IVR system synchronizes an IVR session to a server session. The control software receives a spoken utterance over the voice communication channel, interprets the utterance to recognize a resource identifier in the utterance, and associates the resource identifier with a network address of a server resource. The IVR system commands the server to deliver the server resource identified by that network address to the client. Thus, the server delivers server resources in response to voice commands at the client side. In an alternate embodiment, the voice communication channel is integrated with the data communication channel. The invention also encompasses an apparatus, computer system, computer program product, and computer data signal configured to carry out the foregoing steps.

27 Claims, 12 Drawing Sheets

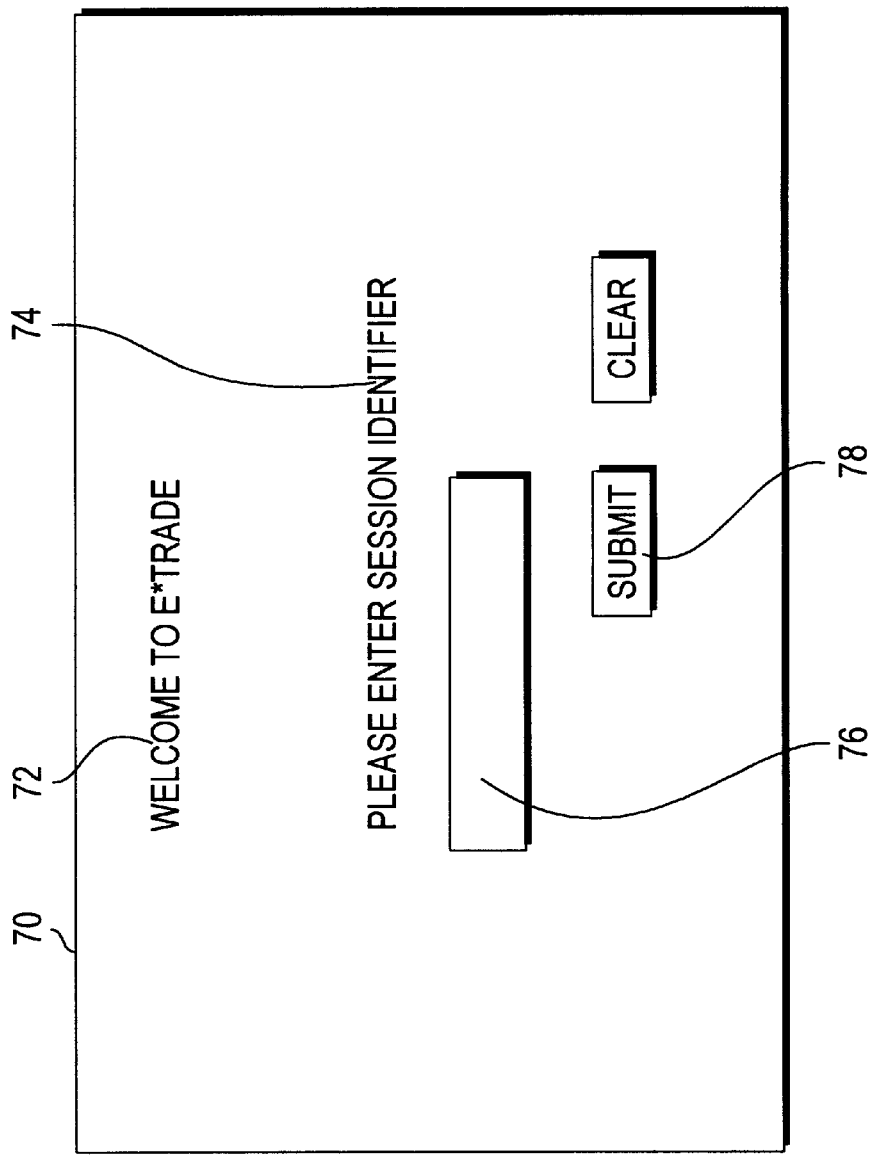

E*TRADE ® visitor center

230

Customer log on

E*TRADE's Free Quotes get PointCast free

Need Help?

E*TRADE advantage

Quotes are delayed 20 minutes during market hours.

Quotes
For a free quote, please enter the symbol:

Account Benefits
Investment Tools
Commissions
Margin Rates
Security
Customer Service
FAQs

| Reset | | Stock ▼ | Get |

232   234   236

Open an account

Symbols
To find a symbol, please enter the name and type below:

Online Application
Request by Mail
Open an IRA

| Reset | | Stock ▼ | Find |

238   234   239

Visitor center

Learn more about E'TRADE by trying our Trading Demo.

210

The E*TRADE Demo
Free Quotes
Play the Stock Game

| quotes | demo | commissions | contact us | help | home |

©Copyright 1996 E*TRADE Securities, Inc. All Rights Reserved.

The Company
Press Releases
Job Opportunities

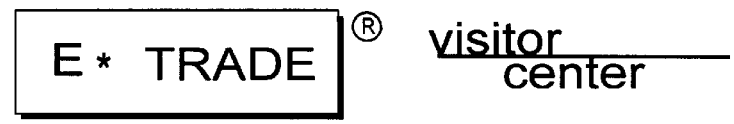

Take advantage of E*TRADE'S low commissions and simple fee structure. For more information, see our full commission schedule. You may also want our trading demo.

| BANKAMERICA CORP ||||||
|---|---|---|---|---|---|
| Symbol: | BAC | High: | 72 1/4 | Volume: | 1,106,400 |
| Price: | 71 1/16 | Low: | 71 | P/E Ratio: | 18.02 |
| Change: | ↓ -1/8 | Open: | 71 15/16 | Earnings: | 3.95 |
| Time: | 4:01 PM | Prev. Close: | 71 3/16 | Exchange: | NMS |

All quotes are delayed 20 minutes during market hours.
52-Week High: 07/25/97  72 3/4
52-Week Low: 09/03/96  37 7/8

Return to the Free Quotes page.

quotes | demo | commissions | contact us | help | home

©Copyright 1996 E*TRADE Securities, Inc. All Rights Reserved.

*Fig. 3D*

**E\* TRADE® stock order**

— 260

Account: 262
Switch Accounts
For help, click on any ▼

▼ Transaction:
- ⦿ Buy
- ○ Sell
- ○ Sell Short
- ○ Buy to Cover

▼ Number of shares: [ ] 264

▼ Stock symbol: [ ]
Find Symbol
266

▼ Price:
- ⦿ Market
- ○ Limit: [ ]
- ○ Stop: [ ]
- ○ Stop Limit: [ ]

▼ Term: [Good for day ▼]

Optional: ▼ All or none   ☐ (300 shares and over)

Trading password: [ ]   Review the order carefully   [Preview Order]   [Cancel]

To place mutual fund orders, use our new E*TRADE Mutual Fund Center.

| main | * the markets | trading | your account |
|---|---|---|---|
| mutual fund center | Investor Tools | Enter Stocks Order | Accounts Balances |
| messages | Markets at a Glance | Open Stocks Order | Accounts Records |
|  | Quotes/News/Charts | Options Trading | Portfolio Summary |
| help | Stock Watch | Transaction History | Switch Accounts |

© Copyright 1997 E*TRADE Securities, Inc. All Rights Reserved.

*Fig. 3E*

VOICE CONTROL OF A SERVER

FIELD OF THE INVENTION

The present invention generally relates to computer systems, and relates in particular to mechanisms that provide voice control of a server.

BACKGROUND OF THE INVENTION

A vast amount of information is available using computer servers. Servers, mainframe computers, and other computer storage devices on networks provide a warehouse of information and services. However, accessing information and initiating processes or services on such servers is difficult using presently available mechanisms. In particular, multiple commands using a keyboard or mouse are usually required for a user to navigate through the file directory structure of a server to locate desired information. The data processing field has failed to develop systems that provide voice control of a remote server from a local point, so that a local user can command the remote server by voice to display visual information at the local point or carry out a desired process.Past systems provide incomplete solutions to this problem. For example, interactive voice response (IVR) systems are used to deliver stored information over a telephone line to an end user. IVR systems are specialized computer systems that have a processor, a storage device such as a hard disk, hardware for interfacing the processor to the public switched telephone network (PSTN) and an IVR application program that runs on the processor. Generally, the end user connects to the IVR system using a telephone. The end user takes the telephone handset off hook and dials a pre-determined telephone number that identifies the IVR system. The telephone call is delivered over the PSTN to one of several trunk lines connected to the IVR system. The IVR system answers the call by seizing one of the trunk lines and playing a pre-recorded greeting to the caller. Typically the greeting is a voice recording stored digitally on a storage device that provides the end user with a menu of processing options that can be selected using telephone dial pad keys. Some IVR systems include voice recognition software or processors, so that an end user can select system options by speaking a short word or phrase such as a number.

Example IVR applications include automated receptionist services, various customer service or "help desk" applications, and airline reservations systems.

IVR systems can be configured to carry out a voice dialogue with the end user. The dialogue comprises a series of questions from the IVR system and answers from the end user until the desired service is provided to the end user by the IVR system. However, IVR systems are unable to display visual information, such as pre-formatted text or graphics, or dynamically created custom graphic information, in conjunction with the dialogue. The absence of visual information from present IVR systems is a major limitation, and represents the loss of a powerful medium for conveying information.

Client-server computer systems also provide an incomplete solution. In a client-server system, a client at a local point is connected by a data connection to a server at a remote point. The client can be a computer or a combination of a computer and software running on the computer. The data connection can be a cable, a local area network (LAN), a wide area network, or another type of network. The data connection can be the global network, operating according to standard protocols, known as the Internet. The server can be a file server of the LAN, or a server not affiliated with the client. For example, the server can be a server that is publicly accessible using anonymous file transfer protocol (FTP) over the Internet. Using the Internet and certain wide area network technologies, a client can connect to, "log on" to, request and use a distant server.

One popular technology enjoying wide use with the Internet is known as the World Wide Web. The World Wide Web enables a computer to locate a remote server using a server name in an agreed-upon format that is indexed at a central Domain Name Server (DNS). The local computer or client runs a browser program. Using the browser, the client locates the remote server using the DNS, and connects to the remote server. The client requests information from the server using a communication protocol called the Hypertext Transfer Protocol (HTTP), by providing a Uniform Resource Locator (URL) that uniquely identifies a page of information stored on the server. A URL is a form of network address that identifies the location of information stored in a network and represents a reference to a remote World Wide Web server, known as a website. The pages of information are files prepared in the Hypertext Markup Language (HTML). Thus, a Web client-server system can be used to request and display information stored on a remote server.

URLs generally are formatted according to the following syntax:

<protocol id>://{<server>} <second level domain><top level domain>{<directory>} {<file>}

The <protocol id> identifies the transmission protocol to be used. For example, in the case of the Web it is <http>, and in the case of an anonymous file transfer protocol transaction it is <ftp>. The <server> element is an optional server name such as <www.>. The <server> element may also identify a directory on a storage device of the Web server that contains HTML documents. The <second level domain> element is the name of the server domain as found in the DNS table, such as <etrade>. The <top level domain> element identifies the type of the second level domain, and must be an item selected from a finite set of globally recognized top level domains, such as "com," "org," "mil," "edu," "gov," and others. The <directory> element is an optional name of a directory within the <server>, such as <DocumentRoot/>. The <file> element is an optional name of a file, document or image to be retrieved, such as <Index.html>. Thus, a URL serves as one type of a network address to locate a document anywhere in a network.

However, client-server systems and World Wide Web systems cannot respond to voice commands and cannot deliver visual or graphic information that is coordinated with a voice dialogue. These systems also do not enable a user to select or initiate computation processes in coordination with a voice dialogue. World Wide Web systems can include panels or pages that are dynamically generated by the systems, and can include internal or external computation processes rather than static documents or pages. However, there is no way to select such processes or locate them using voice interaction.

In addition, when a user wishes to obtain specific information or activate a specific process using a Web server, but the URL of the information or process is unknown, the user must follow the hypertext links of numerous irrelevant pages until the desired information is located. Navigation through this control structure is clumsy. It is especially inconvenient at the slow data transfer speeds that presently characterize most use of the Web.

One approach to these issues is to integrate speech recognition software in a computer program or computer remote from a server. The computer is connected through an interface to a microphone. The computer runs a speech recognition program that converts voice commands received by the microphone into keystrokes or commands understandable by the program. This is known as "local control" or client-side speech recognition because recognition of voice commands is carried out in a local computer. The local computer is separated from a server that stores Web pages and runs application programs that serve the client. The speech recognition controls only the program of the local computer, not the server or applications running in the server. However, such an approach has several disadvantages.

First, high-quality speech recognition is expensive both in the commercial sense and in terms of computing resources and power needed to provide acceptable results. Currently, high-quality speech recognition software is in very limited use and is not generally available at a reasonable price to the vast majority of home or business computer users.

Also, local control allows an end user to access only the information structure presented by the program currently running in the local computer. The voice commands are limited to the command set of the current program. Local control cannot provide flexible shortcuts through a Web site, and cannot enable the Web site to identify, during a voice dialogue with the end user, suitable Web pages to present to the end user.

Thus, there is a need for a system that enables a local client to rapidly retrieve information from a remote server using voice commands.

There is also a need for a system that enables a local client to carry out a voice dialogue with a remote server and receive or retrieve visual and graphic information that is coordinated with the voice dialogue.

There is also a need for an arrangement with which voice commands or a voice dialogue can be used to locate, select, activate or initiate a computing process or service that is available at the server; to locate information in a database, and to execute trades in a securities trading system.

SUMMARY OF THE INVENTION

These and other needs are fulfilled by the present invention, which comprises, in one embodiment, a method of controlling a remote server by a voice command issued from a location local to a client, comprising the steps of establishing a voice communication channel between the location local to said client and the remote server; establishing a data communication channel associated with the voice communication channel between the client and the remote server; receiving the voice command by the voice communication channel; associating the voice command with a resource identifier; selecting a server resource based on the resource identifier; and delivering the resource from the remote server to the client by the data communication channel.

One feature of the invention is establishing the voice communication channel integrated with the data communication channel. Another feature is delivering a voice message over the voice communication channel in coordination with delivery of the server resource. Yet another feature is processing the voice command using a speech recognition process to recognize the natural language phrase.

One aspect of this embodiment is associating the natural language phrase with a network address by performing the steps of: identifying the natural language phrase in a table of the remote server that maps natural language phrases to network addresses; and looking up the network address in the table. A feature of this aspect is loading said document identified by the network address from a storage device coupled to the remote server.

Another aspect of the invention is establishing a data communication channel between the client and the remote server configured to communicate data between the client and the remote server; and establishing a voice communication channel between the client and the remote server configured to communicate sound information including the voice command between the client and the remote server. One feature of this aspect is establishing a telephone connection from the client to a voice recognizer that is coupled to the remote server. Another feature is establishing a telephone connection from the client to an interactive voice response (IVR) system coupled to the remote server. Still another feature is establishing an Internet telephony connection from the client to a voice recognizer that is coupled to the remote server.

Still another aspect of the invention is recognizing the natural language phrase in the voice command at the IVR system; transmitting the natural language phrase to the remote server; and transmitting a voice response from the IVR system to the client.

The invention also encompasses a computer system and a computer program product configured in accordance with the foregoing aspects and f,eatures.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a diagram of an exemplary screen display involved in coordinating data and voice communication channels.

FIG. 3C is a diagram of an exemplary screen display that provides a securities quote entry facility.

FIG. 3D is a diagram of an exemplary screen display showing a securities quote.

FIG. 3E is a diagram of an order page in the brokerage application of FIGS. 3B–3D.

DETAILED DESCRIPTION OF THE PREFERRED EMBODIMENT

A method and apparatus for voice control of a server is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

VOICE CONTROL OF A SERVER

Figure 1A:
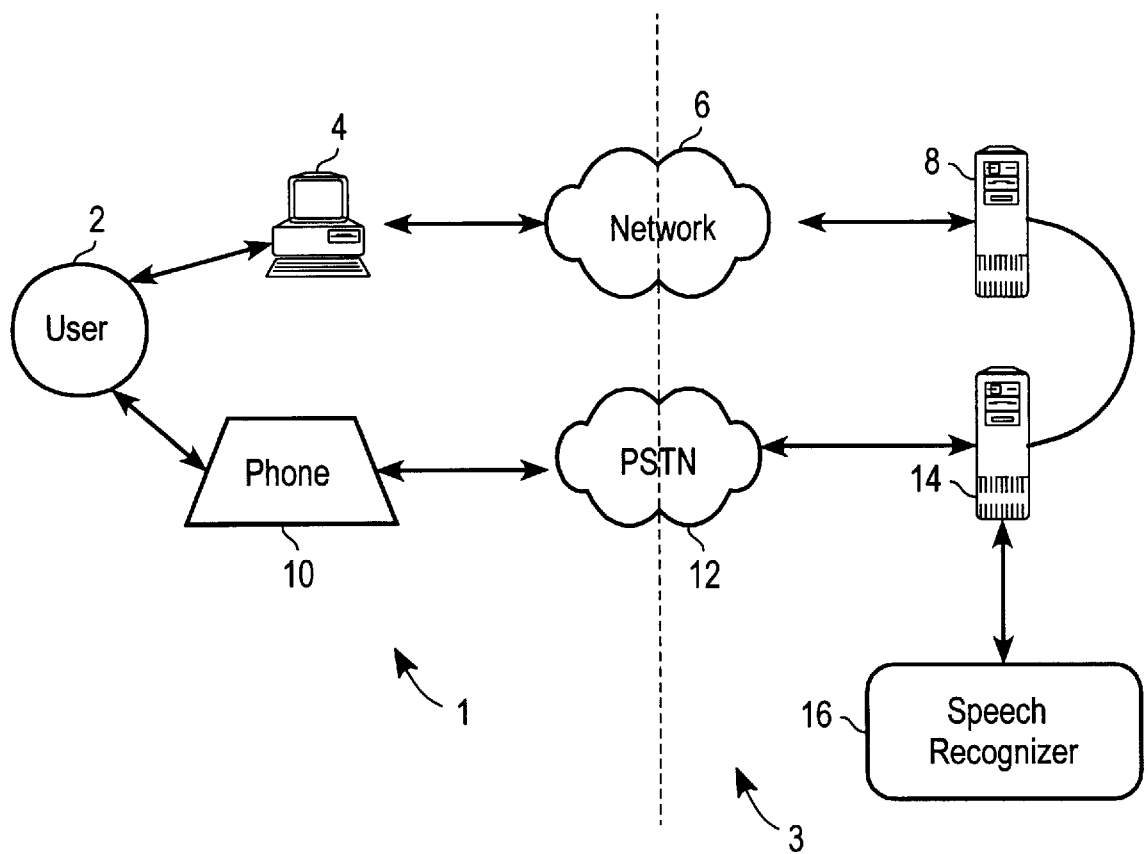
FIG. 1A is a block diagram showing an embodiment of the invention.

FIG. 1A is a block diagram of a system that provides voice control of a server. An end user 2 has a computer 4 and a telephone 10 located at a local point 1. The computer 4 is coupled through a network 6 to a server 8 at a remote point 3. In one embodiment, the network 6 is a local area network, and the server 8 is separated from the end user 2. In the preferred embodiment, the network 6 is the Internet, the server 8 is configured as a World Wide Web server, and the remote point 3 is geographically remote from the local point 1. The connection from the computer 4 to the server 8 is a data communication channel.

The telephone 10 is coupled through the public switched telephone network (PSTN) 12 to an interactive voice response (IVR) system 14. The connection between the telephone 10 and the IVR system 14 is a voice communication channel. The IVR system 14 is coupled to a speech recognizer 16 and to the server 8. In the preferred embodiment, the IVR system 14, the speech recognizer 16, and the server 8 are in the same location, although this is not required. The speech recognizer 16, IVR system 14, and the server 8 can be connected over a network.

Figure 1B:
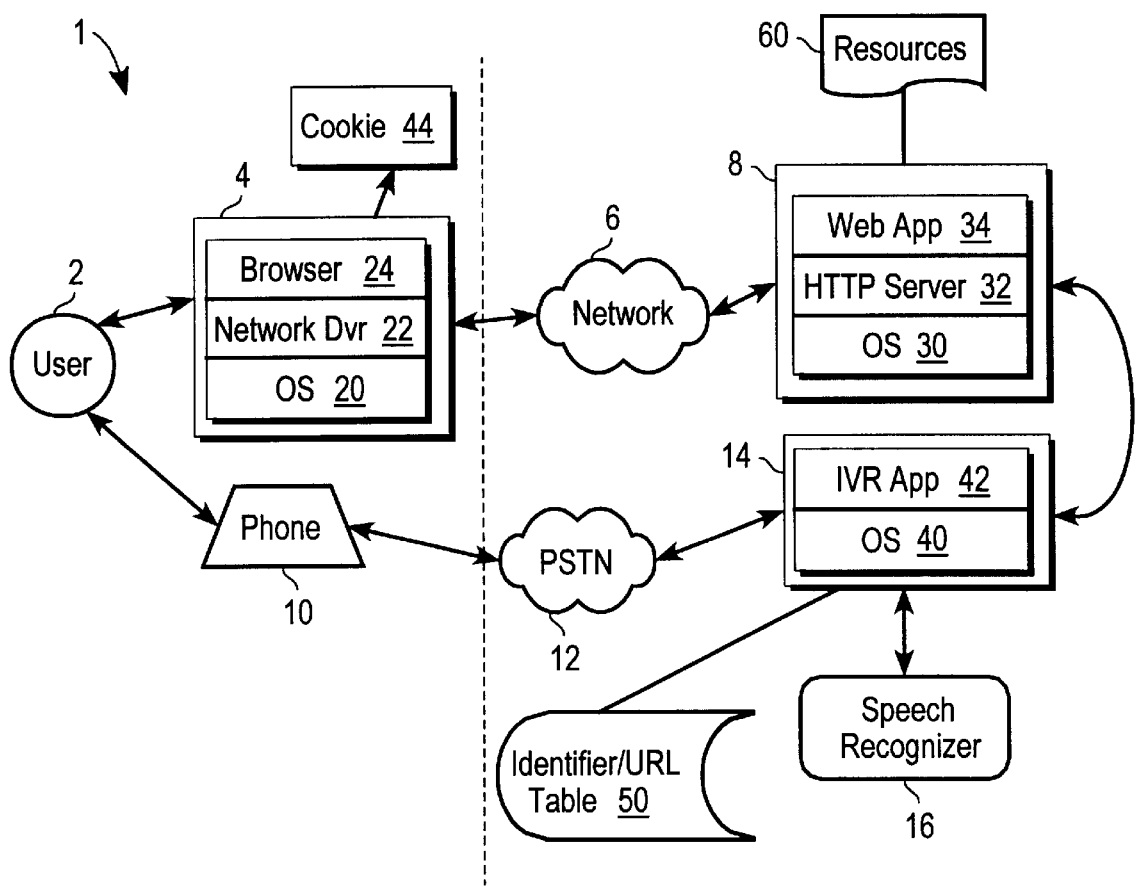
FIG. 1B is a block diagram of a software architecture of the embodiment of FIG. 1A.

FIG. 1B is a block diagram of the software architecture of the system of FIG. 1A. The client computer 4 runs an operating system (OS) 20. Exemplary operating systems include Windows, MacOS, and Solaris. In known manner, the OS 20 provides an interface to the hardware elements of the computer 4 that can be used by application programs; controls and supervises the use of system resources; and loads, supervises and controls the operation of application programs. A network driver program 22 runs on top of the OS 20 and under its control. The network driver program 22 functions as an interface between the OS 20 and the network 6. An example of a network driver program 22 is Novell NetWare. An example of a client computer 4 is a Compaq personal computer, a workstation such as a SPARCstation made by Sun Microsystems, Inc., or a network computer made by Network Computer, Inc.

The client computer 4 also runs a browser 24. The browser 24 is an application program that can read HTML documents, interpret HTML code stored in the documents, and display visual information based on the interpretation of the HTML code on a display of the client computer 4. The user 2 can use computer 4 to command browser 24 to control its display. Examples of suitable programs that can be used for the browser 24 are Netscape Navigator® and Microsoft® Explorer.

The server 8 runs an OS 30 that generally performs the same functions described above in connection with OS 20. The OS 30 may be the same as OS 20 or may be a different operating system. In the preferred embodiment, the OS 30 is an operating system that is optimized to perform server functions, such as Microsoft Windows NT.

Under control of OS 30, the server 8 runs an HTTP server 32. The HTTP server 32 is an application program that enables the server 8 to send and receive information using the HTTP protocol. Examples of available programs that can be used as HTTP server 32 include the Apache HTTP server and Microsoft Internet Information Server. The server 8 may be a computer, or the combination of a computer and a suitable operating environment.

The server 8 also runs a Web application 34. Resources 60 are available in association with the server 8. "Resources" that are "available" on server 8 in this context means documents stored on server 8 or on a network device or system that is accessible through server 8, or computation functions or processes provided by or through server 8. "Resources" also is intended to encompass HTML pages or other electronic information generated dynamically or as output from a program. "Resources" is also intended to include databases accessible through a server; documents, programs, and data accessible using one or more hyperlinks from a first document; and client-server application programs, such as a securities trading system. Such resources may be physically stored on the server 8, or may be physically stored elsewhere and accessed by or using the server 8. For example, the Resources 60 are a set of HTML files stored on a hard disk of the server 8. Such documents are merely an example of the type of files that can be stored in association with the server 8 and delivered to the computer 4 using the invention; other stored information also can be delivered. Alternatively, resources 60 can be programs such as Java applets, ActiveX controls, or other processes, facilities or functions provided by server 8.

Figure 1C:
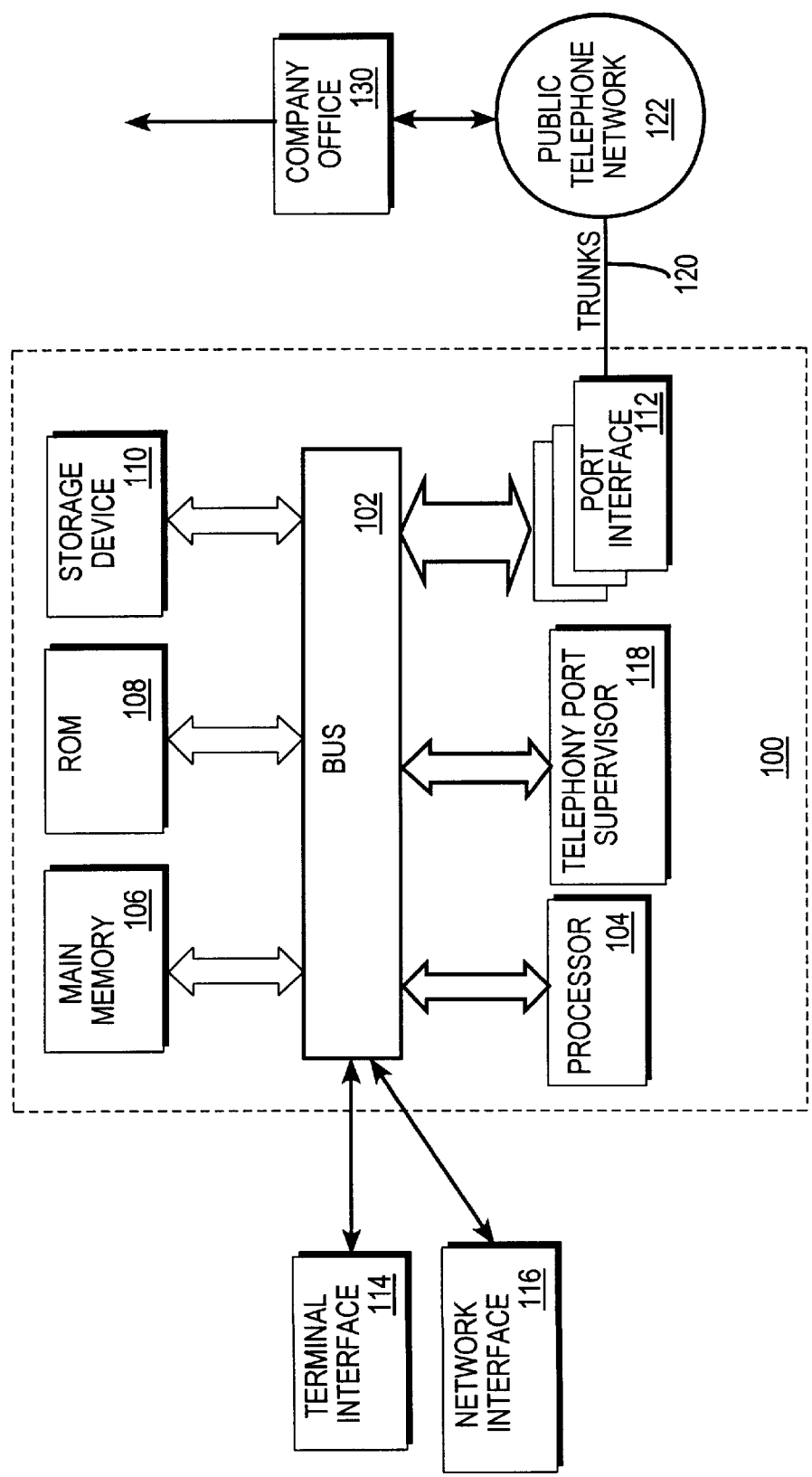
FIG. 1C is a block diagram of hardware elements of an interactive voice response (IVR) system.

FIG. 1C is a block diagram of the IVR system 14. A bus 102 acts as an internal data connection for all the elements of IVR system 14 and provides a central pathway for data and instructions. Processor 104 executes instructions of an operating system and application programs and controls overall operation of the system. Instructions, data, and stored programs are stored in one or more storage devices 110, for example, in a hard disk drive or floppy disk drive. A non-volatile memory 108 such as a ROM is used to store bootstrap instructions and other constant information. Instructions and data for execution and use by processor 104 are loaded from storage device 110 into a volatile local high-speed memory 106, such as RAM.

A terminal interface 114 coupled to the bus 102 provides communications between processor 104 and an external display terminal, which may be another computer. A network interface 116 couples bus 102 to an external data network such as LAN. The processor 104 can load instructions or data from devices coupled to the external data network.

One or more port interfaces 112 connect bus 102 and processor 104 to telephone trunks 120 that are connected to the public telephone network 122. The port interfaces 112 can seize a call on a trunk, answer telephone calls arriving on the trunk 120, place outbound calls, and manage multiple calls on a single line or trunk. The port interfaces 112 can also send and receive call placement and setup control information in the voice band or out-of-band. Each port interface 112 is uniquely identified within IVR system 14 by a port number that is used to select and address the port interface. "Port" refers to a logical connection between IVR systems 14 and one or more telephone lines of a trunk 120.

A telephony port supervisor 118 provides electronics for controlling the port interfaces 112. The port supervisor 118 can select an available port interface and route commands or data from processor 104 to an available port interface 112.

The public telephone network 122 connects calls to or from trunks 120 through one or more telephone company offices 130 and to or from remote telephones or other equipment.

The network interface 116 or terminal interface 114 also can connect an external computer, such as server 8, to IVR system 14.

FIG. 1B also shows the software architecture of the IVR system 14. The IVR system 14 is a computer that runs an OS 40. The OS 40 can be the same operating system as OS 20, 30, or a different operating system. Because the IVR system 14 is expected to respond to telephone calls arriving from the PSTN 12 on a live, real-time basis, it is advantageous for OS 40 to be optimized to handle real-time tasks. An example of such a real-time optimized OS is the QNX operating system, which can be used as OS 40. IVR systems are commercially available from InterVoice, Octel Corporation, and others.

The IVR system 14 also runs an IVR application program 42 under control of OS 40. In cooperation with the OS 40, the IVR application program 42 is responsible for detecting incoming calls, answering incoming calls, presenting pre-recorded greetings and messages to the caller, receiving and interpreting caller inputs, and responding to caller inputs. The IVR application program 42 defines features and functions available to the end user 2 for controlling the IVR system 14. The IVR application 42 also provides an interface to an IVR system operator, such as a command line interface, graphical user interface, or terminal interface. An operator can connect a computer or "dumb terminal" to program the IVR system 14 or monitor its operation.

The IVR application program 42 can also control communication between the IVR system 14 and the server 8. In one embodiment, the IVR system 14 and the server 8 each have serial data ports that are connected by an RS-232 serial data connection. The IVR application program 42 can read from or write to the serial data port of IVR system 14. Accordingly, the IVR application program 42 can command the server 8 to generate, load, and/or send Resources 60 through the network 6 to browser 24.

The IVR system 14 is coupled to a speech recognizer 16 and an Identifier/URL table 50. In an alternate embodiment, the speech recognizer 16 is integrated into the IVR system 14.

A function of the IVR application program 42 is to receive a voice phrase from the voice communication channel and forward the voice phrase to the speech recognizer 16 for recognition. The speech recognizer 16 receives a voice phrase or utterance in the form of a digitized waveform. The speech recognizer 16 attempts to match the digitized waveform with one of a set of stored waveform images that represent "known" utterances or words, according to mathematical rules and transformations programmed into the speech recognizer. In this way, the speech recognizer essentially scans the voice phrase to identify words in it, and provides a digital text string or code as output. Each digital text string or code is uniquely associated with a pre-defined natural language phrase. For example, although every individual speaker may say the natural language phrase "yes" in a different way, once the speech recognizer 16 recognizes an input utterance as the phrase "yes," the speech recognizer provides a single code or text string as output. Hardware and software usable for speech recognition is well known in the art and is generally described in G. Pelton, "Voice Processing" (New York: McGraw-Hill, Inc., 1993). Manufacturers of commercially available speech recognition equipment and software include Dragon Systems, IBM, Applied Language Technologies and Nuance.

In the preferred embodiment, the speech recognizer 16 carries out continuous, speaker-independent speech recognition, meaning that the speech recognizer will recognize words that are spoken continuously without pauses that separate the words, and will recognize any speaker without a training session. Also, in the preferred embodiment, the speech recognizer 16 associates an utterance or voice phrase spoken by the user 2 and received over the voice communication channel with a resource identifier. In this context, "resource identifier" means a name, label or number that non-uniquely identifies a resource, or provides a mapping of an utterance to a resource or class of resources. For example, when the utterance is "stocks," the resource identifier could be "stock-functions." The same resource identifier could be used for an utterance of "bonds," so that utterances of "stocks" or "bonds" lead to the same resource or group of resources.

Another function of the IVR application program 42 is to associate a natural language phrase or resource identifier detected by the speech recognizer 16 with a URL of a Web document 60 stored in association with the server 8. The Identifier/URL table 50 stores associations of resource identifiers and URLs of Resources 60. In one embodiment, the Identifier/URL table 50 is a table of a relational database system having columns for an index value, a phrase code, a natural language phrase or resource identifier, and a URL. For example, the Identifier/URL table 50 has a record that has the values 101, 100, "home page", and a URL value that identifies a home page of the resource. This record indicates that the natural language phrase "home page" is associated with a Web document 60 having the specified address. Alternatively, the resource identifier "home-page" is stored and associated with the same resource.

In operation, the user 2 connects the client computer 4 to the server 8 over the network 6 using the browser 24. For example, the user 2 enters a URL that identifies a known home page of the server 8 into a URL field of the browser 24. The browser commands the network driver program 22 to establish an HTTP connection over the network 6 to the HTTP server 32 of the server 8. When the HTTP connection is established, the browser 24 requests the document identified by the URL from the server 8, for example, by issuing the HTTP GET command with the URL as an argument or parameter. In response, the server 8 searches for the requested document among the Resources 60. If a matching file name is found, the server 8 loads the requested document from the Resources 60 and delivers it over the HTTP connection to the browser 24. The browser 24 reads HTML code in the document, interprets the code, and displays the document in interpreted form on a display of the computer 4.

FIG. 3A is a diagram of a home page 70 that is initially displayed by the browser 24 in the preferred embodiment. The home page 70 contains a banner greeting 72, such as "Welcome to E*TRADE." The home page 70 also contains a prompt 74 that requests the end user 2 to enter a session identifier in a data entry field 76. The data entry field 76 is encoded in the home page 70 using HTML tags in a manner known in the art.

To obtain a session identifier, the end user 2 takes the telephone 10 off hook and dials a pre-determined telephone number associated with the IVR system 14. The PSTN 12 routes the call to the IVR system 14 using a trunk associated with the IVR system 14. When the IVR system 14 detects the incoming call, the IVR system 14 seizes the trunk, generates a unique session identifier, and plays a prerecorded greeting to the caller that includes the session identifier, such as:

"Welcome to the E*Trade Voice Command System. Please make a note of your session number. Your session number is 12345."

Concurrently, the IVR system 14 stores information that uniquely identifies the inbound call in memory in association with a copy of the session identifier. For example, the IVR system 14 stores, in a table of a database in the IVR system, the port number of an interface card in the IVR system that is handling the inbound call. Using this information, when the IVR system 14 needs to play other audible information to the caller, the IVR system can route the audible information to the correct port.

In response, the user 2 enters the session identifier into the data entry field 76 of the home page 70, and presses the SUBMIT button 78 using a mouse connected to the user's computer 4. In response, the browser 24 sends the value entered in the data entry field 76 back to the server 8. The session identifier on the IVR system is associated in the server with the IP address of the computer that sent the session identifier. The server 8 provides the filled-in home page 70 to the Web application 34.

The Web application 34 sends a message to the IVR system 14 that asks the IVR system whether it recognizes the session identifier entered by the user; the session identifier is provided as part of the message. In response, the IVR system 14 searches its memory to locate the session identifier. If it is found, the IVR system 14 sends an affirmative message back to the server 8, indicating that the session identifier is recognized. In this way, an HTTP session running on the server 8 is synchronized to an interactive voice session running on the IVR system 14. The computer 4, the HTTP session, a port of the IVR system 14, and an interactive voice session are all associated with one another so that they can be coordinated.

Figure 3B:
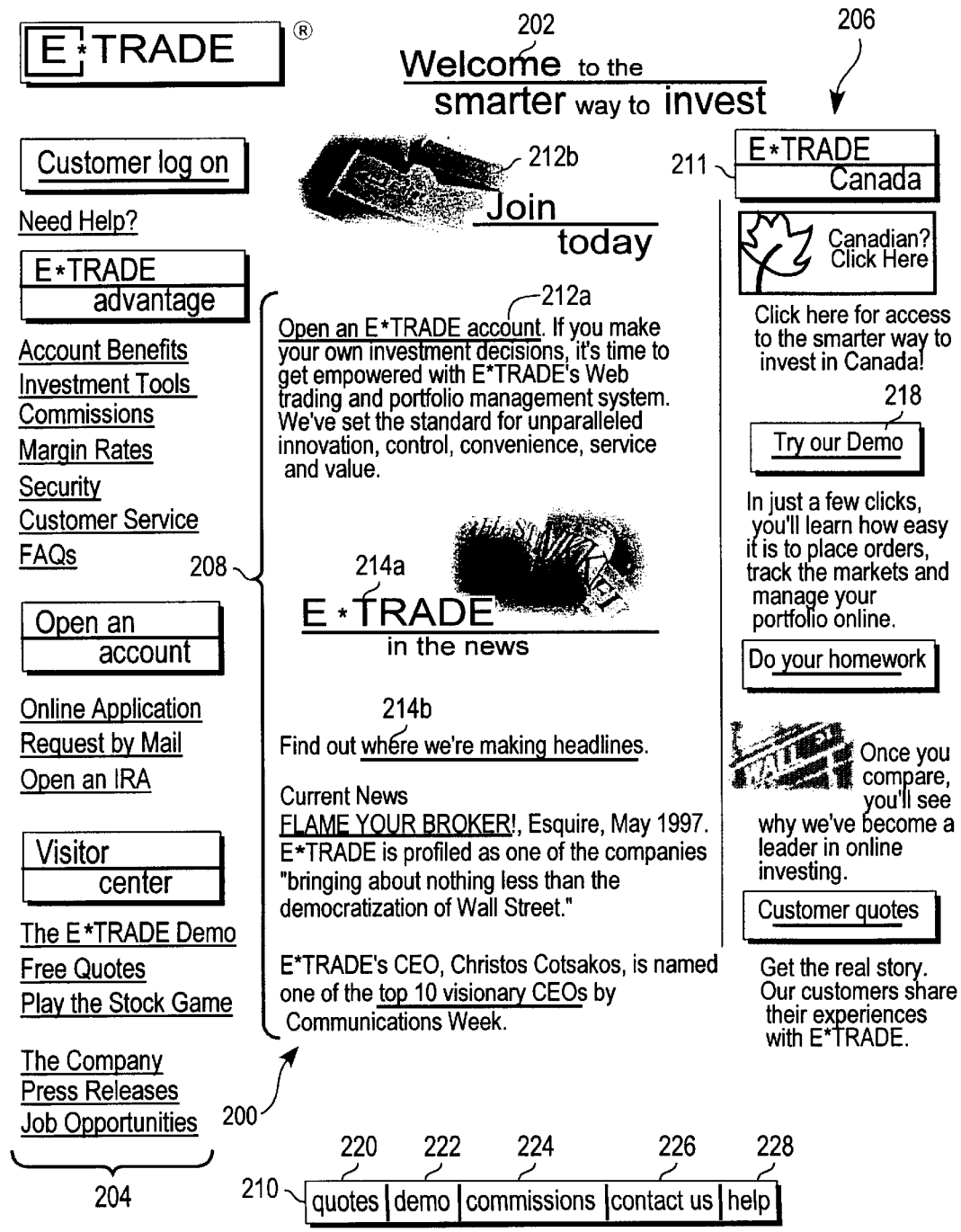
FIG. 3B is a diagram of an exemplary screen display of a Web securities brokerage application that can be used with the invention.

The Web application 34 retrieves a second Web page that contains a top-level menu for the services to be provided to the user 2 using the Web application 34. For example, FIG. 3B shows a Web page 200 of an online stock brokerage application that can be used with the invention. It provides the user 2 with a list of trading functions, account review functions, and industry information sources. The page 200 has graphical and text elements including a banner 202, a utility menu column 204, a promotional menu column 206, a news column 208, and a menu bar 210 displayed in combination. Each of the graphical and text elements is defined in HTML language source code that is interpreted by the browser 24 to cause the page to be displayed.

Certain underlined text items and graphics are connected by hyperlinks to other Web pages associated with the Web page 200, which is called a top-level page or home page. A hyperlink is a logical connection from one data file to another data file that is activated when the user 2 selects the hyperlink and commands the browser to jump to the page associated with the hyperlink. Most hyperlinks are URLs, and they are defined in the HTML source code of the page 200. When the browser 24 loads and displays a Web page, it builds a table in memory of each hyperlink and its associated screen location. Generally, the user 2 can accomplish this by using a mouse of the computer 4 to move a cursor on the display screen over the hyperlink and pressing a button on the mouse. Usually, the user 2 does not know the URL of the hyperlink; however, when the user 2 hovers the cursor over the hyperlink, the browser 24 will display the URL associated with the hyperlink in a field of the browser. This is called "pointing and clicking," and selection of the hyperlink is called "clicking on" the hyperlink.

For example, each of the underlined text items in the utility menu column 204 is a hyperlink to a Web page that presents information relating to the underlined text item. When the user 2 clicks on the Online Application text item of the utility menu column 204, the browser 24 will load the URL associated with the text item and display that page.

In some instances, graphic items are associated with hyperlinks. For example, the Join Today graphic 212b of Web page 200 is such an "active graphic." The hyperlink associated with the Join Today graphic 212b is activated when the user 2 clicks on any visible region of the graphic.

Active graphics and text items can be associated with the same hyperlink. For example, the Join Today graphic 212b and the "Open an E*TRADE account" text item 212a are associated with the same hyperlink. The E*TRADE In The News graphic 214a is associated with the "where we're making headlines" text item 214b, and both are associated with the same hyperlink. Each of the words in the menu bar 210 is a separate active graphic that is associated with a different hyperlink.

According to one embodiment of the invention, each of the graphic elements and text items of a Web page 200 are associated with a natural language phrase in the Identifier/URL table 50. Each of the natural language phrases is associated with a URL stored in the same table. Each of the natural language phrases also is associated with a context. The context is used to simplify phrase recognition by reducing the number of natural language phrases that need to be searched for a particular voice command. The IVR application first identifies a context using words recognized by the speech recognizer. The IVR application then searches the natural language phrases in the identified context in an attempt to locate a specific phrase to associate with the voice command. In this way, the process of associating a natural language phrase with a network address or URL can ignore phrases in the Identifier/URL table 50 that are in irrelevant contexts.

Table 1 is an example of the contents stored by Identifier/URL table 50 for Web page 200:

TABLE 1

EXAMPLE PHRASE/URL TABLE

| CONTEXT PHRASE | GRAPHIC/TEXT | URL |
|---|---|---|
| Context: Help | | |
| help | Need Help? | Link to a Help page |
| help me | Need Help? | Link to a Help page |
| Context: Accounts | | |
| I'd like to open an account | Online Application | Link to a page containing an online application |
| new account | Online Application | Link to a page containing an online application |
| Context: News | | |
| news | E*TRADE in the news | Link to a page containing news or other links to news information |
| Context: Company | | |
| corporate background | The Company | Link to a page containing company information |

TABLE 1-continued

EXAMPLE PHRASE/URL TABLE

| CONTEXT PHRASE | GRAPHIC/TEXT | URL |
|---|---|---|
| palo alto office | — | Link to a page containing information about company offices |
| I'd like to buy stocks | Customer log on | link to a customer system log-on page |

Alternatively, the Identifier/URL table 50 can be organized as a tree, multiply-linked list, or any other data structure that is suitable for representing phrases, contexts, hyperlinks, and URLs. In addition, in Table 1 and in the discussion herein that references Table 1, data referred to as a natural language phrase may also be a resource identifier.

As shown in Table 1, natural language phrases can be associated with Resources 60 that are several layers deep in the overall conceptual hierarchy of the Web site associated with the page 200. For example, the phrase "palo alto office" is associated with a Web page located in a subdirectory, "contacts," of the root directory that stores the home page. The mapping provided in the Identifier/URL table 50 enables the user to jump into the contents of a subdirectory using a single verbal command. This is a significant advantage over the prior art in which the user must negotiate links at each subdirectory level.

The invention also permits a user 2 to provide complex queries that result in initiation of complex communication processes or display of custom information by the server 8. For example, when presented with the Web page 200, the user 2 may speak a complex query such as "Give me a stock quote for BankAmerica Corporation." IVR application 42 identifies key terms in the query such as "STOCK QUOTE" and "BANKAMERICA CORPORATION." In one embodiment, IVR application 42 maintains a table of "stop words" such as "me," "a" and "for" that do not affect interpretation of the query or association of the query with a URL. Words recognized in the query that are found in the table of stop words are essentially discarded during the IVR recognition process. When the terms STOCK QUOTE are recognized, they are associated with a resource identifier and its URL.

When used without speech recognition, Web application 34 obtains a copy of the quote entry page 230 shown in FIG. 3C. Page 230 contains a quote symbol entry field 232, a quote type pull-down menu 234, and a GET button 236, which are defined in the HTML source code of the page 230 using standard HTML tags. When page 230 is displayed by a browser without use of the invention, a user 2 may type the stock exchange symbol of a stock in the field 232. If the user 2 wants a quote for a traded security other than a stock, the user can click on the menu 234 to display a list of other securities that can be quoted, such as options, commodities, or mutual funds. When the user 2 clicks on the GET button 236, browser 24 returns a copy of the page 230, with the field 232 filled in, to the server 8. The server 8 identifies the contents of the field 232, searches a database of stock quote information, prepares an HTML document containing the price of the selected stock, and returns the document to the browser 24 over the data communication channel.

If the user 2 does not know the trading symbol, the user may enter the name of a security in the symbol name field 238 and click on the FIND button 239. In response, the server 8 searches a table of security names and symbols, locates the name entered by the user, and returns the symbol associated in the table with that name.

Although FIG. 3C depicts the page 230 in the form displayed by a browser, in the preferred embodiment of the invention, the page 230 is not sent over the data communication channel and is not displayed by browser 24. Web application 34 receives the recognized phrase BANKAMERICA CORPORATION from IVR application 42. Web application 34 recognizes that the string BANKAMERICA CORPORATION does not fit the field 232, but does fit the name field 238. Accordingly, Web application 34 inserts BANKAMERICA CORPORATION into the name field of a copy of the page 230 and activates the FIND button 239. Server 8 carries out the requested stock symbol search and returns the symbol BAC. Web application 34 inserts the symbol BAC in the symbol field 232 and activates the GET button.

In response, server 8 prepares and communicates a quote display page 240, as shown in FIG. 3D, to the browser 24. The display page 240 is stored in server 8 as an HTML template that contains no data relating to a quoted stock. The Web application 34 loads the template, fills in the template with data relating to a particular quoted stock, and sends the completed document to browser 24 over the data communication channel. The template has a symbol display field 246 that is filled in with the selected symbol, and a price display field 244 that is filled in with the current price of the selected security, loaded from a price table accessible to the Web application 34. Other price information 248 and trading volume information 250 is included in the display page 240. When the display page 240 is sent to the browser 24, the Web application 34 commands IVR system 14 to play a pre-recorded message over the voice communication channel, such as "A quote for the security selected by you is now being displayed on your screen."

Thus, the Web page 200, Identifier/URL table 50, IVR application, and Web application are integrated so as to provide a coordinated visual and audible dialogue with the user 2. The Web application 34 commands the HTTP server 32 to send the Web page 200 to the computer 4. The HTTP server 32 retrieves the Web page 200 from among the Resources 60 and transmits the page to the browser 24. At the same time, the Web application 34 commands the IVR system 14 to play a second pre-recorded phrase over the PSTN 12 to the telephone 10.

Preferably, other securities trading functions are provided. The Web page 260 shown in FIG. 3E is used to buy or sell a stock or other security. The user 2 uses voice commands to issue a request to trade a security, including the name of the security to be traded. For example, the voice command is "BUY 100 SHARES IBM." The IVR system 14 recognizes the request (BUY), the name of the security (IBM), and the quantity to be traded (100 SHARES) in the voice command and provides them to the Web application 34. The Web application 34 associates the recognized natural language phrases with a trading function, and passes the phrases to the trading function. The Web application 34 fills in appropriate fields of the web page 260, such as the Transaction type button 262, the Number of Shares field 264, and the stock symbol field 266. The Web application 34 executes the requested trade, alone or in communication with a specialized trading server that is coupled to the server 8. The Web application 34 commands the IVR system 14 to play a pre-recorded message confirming the trade over the voice communication channel. In coordination with the message, the Web application prepares a graphical trade confirmation page and transmits it to the browser 24.

Voice commands also can cause the server to initiate a process or computing function. For example, the Web application 34 includes stock graphing functions which display the price of selected stocks over various time periods. This function is accessed by navigating the server using voice commands, to reach a screen or panel that displays the function. The user enters or selects parameters that specify the form and contents of the display to be generated, also using spoken words. The IVR system recognizes, in one of the voice commands, a resource identifier that identifies a program or applet for carrying out the function. The Web application 34 looks up the URL of the resource in the Identifier/URL table 50. In this example, the URL can specify a Perl script, CGI script, or other mechanism for calling a program outside the server or web application. The program, function or process that is identified by the URL is loaded and run using variables specified by the user with voice commands.

In this manner, the server 8 and the IVR system 14 provide computing functions, data files and visual information to the computer 4, and pre-recorded audible information to the telephone 10, in a coordinated and complementary way for as long as the user 2 desires service. The user speaks natural language phrases to the IVR system. The IVR system recognizes the phrases and associates the phrases with a network address, resource identifier, URL or web page using the Identifier/URL table 50. The IVR system provides the session identifier and the network address to the web server. The server retrieves the resource identified by the network address, and delivers the resource to the browser, using the session identifier to select and identify the client and transaction. The specific pages delivered from the server 8 to the computer 4 are determined by the nature of the resource and by the nature of the application with which the invention is used.

In an alternate embodiment, the server 8 is coupled to an expert system that is configured to manage a natural language dialogue with the system user. This dialogue takes the form of both verbalizations and presentation of text and graphics to the user via the web. In this embodiment, IVR system 14 and speech recognizer 16 provide a string of recognized words and/or phrases to the server 8. Web application 34 forwards the string to the expert system and the expert system determines whether to ask another question of the user, to present a graphic, to do both, or to do something else such as presenting a conclusion of some sort.

For example, in one instance this dialogue involves advising the user on the best type of cellular phone to buy. The expert system generates appropriate questions to ask the user, and presents text, diagrams, photographs and other graphics as appropriate. It also sends audio as desirable, either through an internet telephony connection, or through the web browser or telephone in the case of the IVR implementation (which includes a telephony channel which is separate from the web browser). At the end of the dialogue, the expert system proposes purchase of the recommended cell phone, and initiates order processing if the sale is made.

As another example, the dialogue advises on problem solving or troubleshooting, such as fixing minor problems that might arise in the operation of a copier. The expert system flexibly directs the gathering of information by asking the user questions, with response to questions in the form of speech by the user. The expert system sends a URL to the server for presentation of appropriate diagrams to assist in determination of the problem. In some cases the expert system flashes various parts of the diagram; for instance, "If the paper jam is occurring in this area (flash part of the diagram) then say 'yes' now. If the paper jam is occurring in this area (flash another part of the diagram) then say 'yes' now."

Figure 2A:
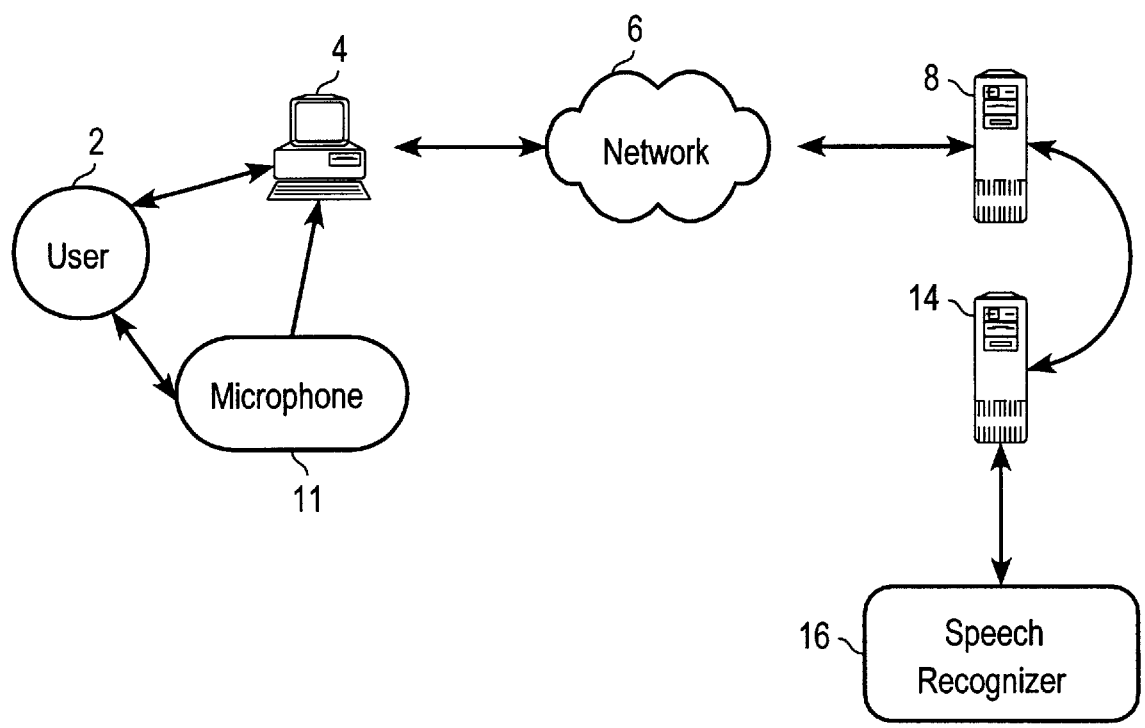
FIG. 2A is a block diagram showing an alternate embodiment of the invention.

FIG. 2A is a block diagram of an alternate embodiment of the invention. The user 2, computer 4, network 6, server 8, IVR system 14, and speech recognizer 16 are structurally arranged in the same relationship as in FIG. 1A. A microphone 11 is coupled to the computer 4 through a suitable interface that has an analog-to-digital converter for converting utterances spoken into the microphone into digital information. An exemplary interface is the SoundBlaster® sound card or the equivalent. The microphone 11 is located in association with the user 2 so that the user can speak utterances or voice commands into the microphone 11. When the user 2 speaks into the microphone 11, the analog-to-digital converter of the microphone interface converts an analog signal from the microphone into a digital file that is stored in memory and represents the analog signal. A processor in the computer 4 can read the digital file and provide its contents to application programs.

Figure 2B:
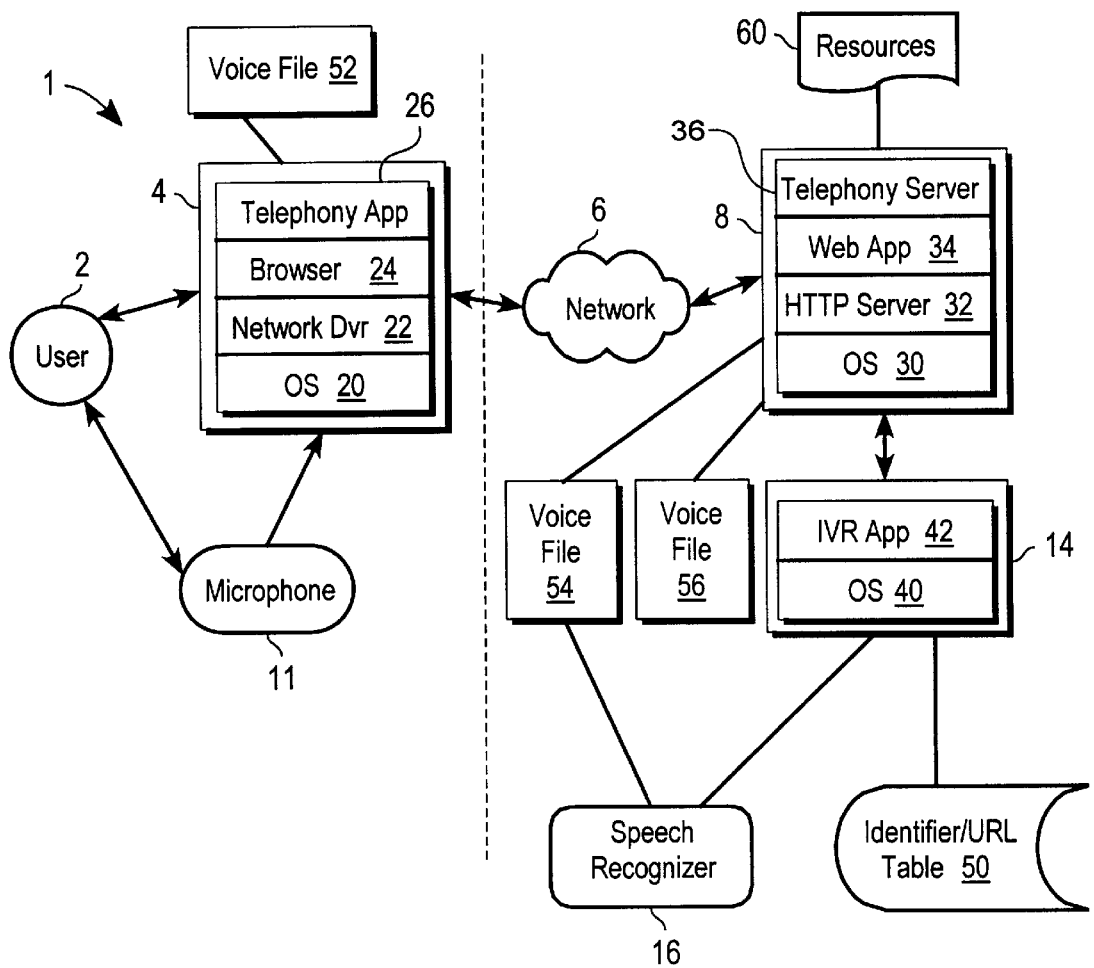
FIG. 2B is a block diagram of software architecture of the embodiment of FIG. 2A.

FIG. 2B is a block diagram of the software architecture of the embodiment of FIG. 2A. The computer 4 runs an Internet telephony application program 26. The Internet telephony application program 26 enables a telephone call to be communicated over the Internet to a remote location. An exemplary commercially available program that can be used for the Internet telephony application program 26 is Web-Phone®. The program 26 commands the microphone interface to receive utterances spoken into the microphone 11. In real time, spoken utterances are received by the program 26 and stored in an analog file in main memory of the computer 4. The program 26 carries out analog-to-digital conversion on the analog file to convert the utterances into a digital voice file 52 stored in a storage device of the computer 4.

The program 26 requests the browser 24 to establish an HTTP connection to the Web server 8. The program reads the digital voice file 52 and transports a copy of the voice file 52 across the Internet using HTTP to the server 8.

The server 8 additionally runs a telephony server program 36 under control of OS 30. The telephony server program 36 complements the telephony application program 26. The telephony server program 36 cooperates with the telephony application program 26 to establish an HTTP connection to the telephony application program 26. Using the telephony server program 36, the server 8 receives the copy of the digital voice file 52 and stores the copy as digital voice file 54 in a storage device associated with the server 8, such as a network disk drive.

Under control of the Web application 34, the server 8 passes the digital voice file 54 to the speech recognizer 16. Since the voice file is in digital format, the server 8 and the IVR system 14 do not carry out analog-to-digital conversion on the voice file 54. The speech recognizer 16 executes speech recognition processes on the digital voice file 54 to recognize a natural language word, phrase, resource identifier, or command in the digital voice file. When the speech recognizer 16 recognizes natural language phrases, or resource identifiers, they are passed to the IVR application 42, which associates the phrases or identifiers with a network address of a Web page in the Identifier/URL Table 50. The associated Web page is retrieved from among the Resources 60, and transmitted to the browser 24 over the network 6. Alternatively, a function or process identified by the resource identifier is located and invoked or executed, respectively.

In this manner, Internet telephony is used to establish a voice communication channel from the local point 1 to the server 8. The voice communication channel is integrated with the data communication channel. For example, the voice communication channel can be an HTTP connection that is established in parallel with a separate HTTP connection that is used to communicate Web pages and HTTP requests between the browser 24 and the HTTP Server 32. Since HTTP is a transactional protocol, voice packets and data packets can be interleaved in a single HTTP connection, or delivered serially in separate transactions and separate connections. When the voice communication channel is established in this way, operation of the invention proceeds as described in connection with the other embodiments.

In still another alternate embodiment, information delivered from the server 8 to the client computer 4 is provided in audible form that is played by the computer 4. In this embodiment, the computer 4 is equipped with hardware that can receive a digital signal representing sounds, convert the digital signal to an analog signal, amplify the analog signal, and play the analog signal through one or more loudspeakers. For example, the computer 4 has built-in multimedia hardware, or an interface board providing sound capability, such as the SoundBlaster® interface board. Web pages sent from the server 8 to the computer 4 have sound files embedded in them. Through a plug-in, an associated program, or internal program code, the browser 24 can identify a sound file referenced in a Web page and play the sound file through the interface board. In this arrangement, the Web application and the IVR application program are configured to provide a coordinated dialogue with the user, comprised of sound delivered through the voice communication channel, graphics and images delivered through the data communication channel, and sound files delivered through the data communication channel.

The Web application 34 and the IVR application 42 can be combined into a single application program that controls operation of the server 8 and the IVR system 14.

In another embodiment, the functions of the IVR system 14, IVR application 42, and speech recognizer 16 are integrated into server 8. For example, the server 8 is equipped with telephony port interfaces connected to telephone trunks. The server 8 runs one or more software processes that control the telephony hardware, manage inbound and outbound calls, and carry out speech recognition and the other functions of the IVR system 14 and speech recognizer 16.

In another embodiment, the telephony application program also has a tokenizing speech recognition module. The tokenizing speech recognition module receives and reads the digital file produced by the analog-to-digital converter of the microphone interface. At the computer 4, the tokenizing speech recognition module analyzes the digital file and converts waveforms into tokens. The tokens represent parameters that describe aspects of the audio waveform stored in the digital file. For example, the tokens represent the length of the utterance, the area of signal with respect to time represented by the utterance, and other characteristics.

A stream of such tokens, in digital form, is delivered over the network 6 to the server 8. At the server 8, the Web application 34 receives and interprets the stream of tokens. The Web application 34 converts the stream of tokens to a resource identifier for a resource associated with the utterance. Retrieval or activation of the resource then occurs, in the same manner discussed above in connection with the other embodiments.

Using this structure and process, the amount of data transferred over the network is significantly reduced. The tokens can be represented symbolically and communicated in character form. This approach avoids transmission of digitized speech files over the network. Thus, this approach is suitable for use with networks with limited bandwidth.

VOICE COMMAND PROCESS

Figure 4:
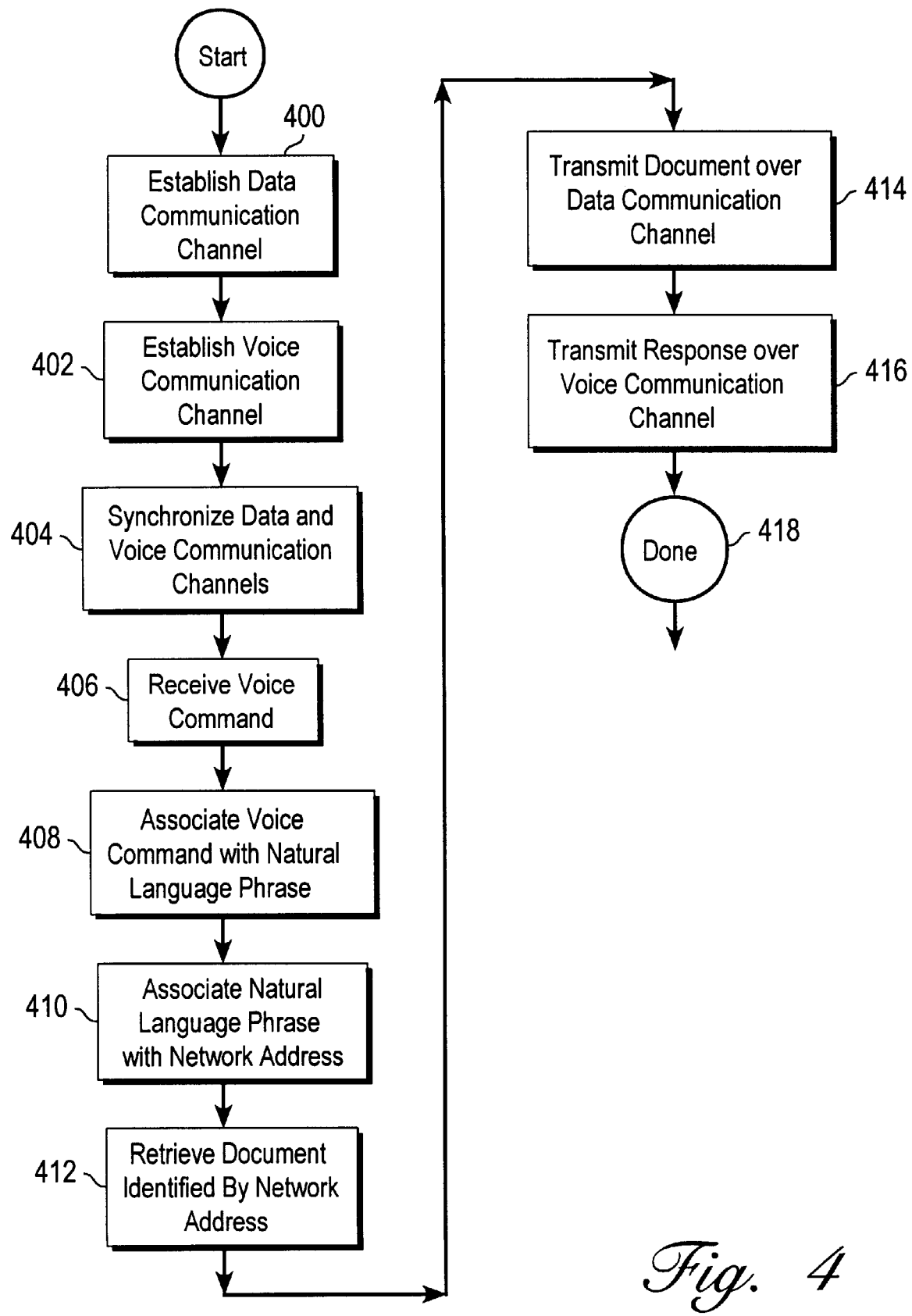
FIG. 4 is a flow diagram of an embodiment of a process for voice control of a server.

FIG. 4 is a flow diagram of a process for controlling a server using voice commands. In step 400, a data communication channel is established between the server and a client that will control the server. For example, a browser and a data communication program are executed in a computer at a local point, and a server program is executed in the server. The browser uses the data communication program to call the server, directly or through an intervening network, and establish a transactional connection to the server.

In step 402, a voice communication channel is established between the client and server. For example, a user of the client places a telephone call to an IVR system associated with the server. Alternatively, the user places the call to telephone hardware provided in the server, or the client places the call. In another alternative, the voice communication channel is established using a digital connection between the client and the server, by using Internet telephony programs in the client and server to communicate digitized voice signals.

In step 404, the data communication channel and the voice communication channel are synchronized. For example, the user provides a session identifier to the server, and the server associates the session identifier with a telephony port associated with the voice communication channel.

In step 406, a voice command is received, preferably at the client. The client transmits the voice command over the voice communication channel to the server. In step 408, the voice command is associated with a natural language phrase or resource identifier, for example, by carrying out voice recognition processing on the voice command at the server or at a voice recognizer coupled to the server. In step 410, the natural language phrase or resource identifier is associated with a network address, such as a URL of a resource accessible to the server. For example, the server locates the natural language phrase in a stored table that maps natural language phrases to network addresses, and then retrieves a document at the network address associated with the selected natural language phrase.

In step 412, the resource identified by the network address is activated, for example, by loading the document into server memory or by activating a program resource. In step 414, information from the resource is transmitted over the data communication channel to the client. For example, when the data communication channel is an HTTP connection, the server uses HTTP commands to transmit the information to the client. The client runs a browser program that interprets the information and displays it.

In step 416, a voice response is transmitted over the voice communication channel to the client. In one embodiment, the server commands an IVR system coupled to the server to play a pre-recorded message over the voice communication channel, using the port that is synchronized to the data communication channel. Alternatively, the server uses the Internet telephony programs to transmit sound. In yet another alternative, the server has text-to-speech conversion capability. The server retrieves a text file containing a stored response, passes the text file through a text-to-speech converter, and routes the synthesized speech to the voice communication channel. The process is generally complete at step 418, however, steps 406 to 416 may be repeated as part of an ongoing dialogue or transaction with an end user associated with the client.

In other embodiments, the steps shown in FIG. 4 are carried out in the manner specifically described herein with respect to the hardware elements and software processes of the invention shown in FIGS. 1A–1C, FIGS. 2A–2B, FIGS. 3A–3E, and FIG. 5.

COMPUTER HARDWARE OVERVIEW

Figure 5:
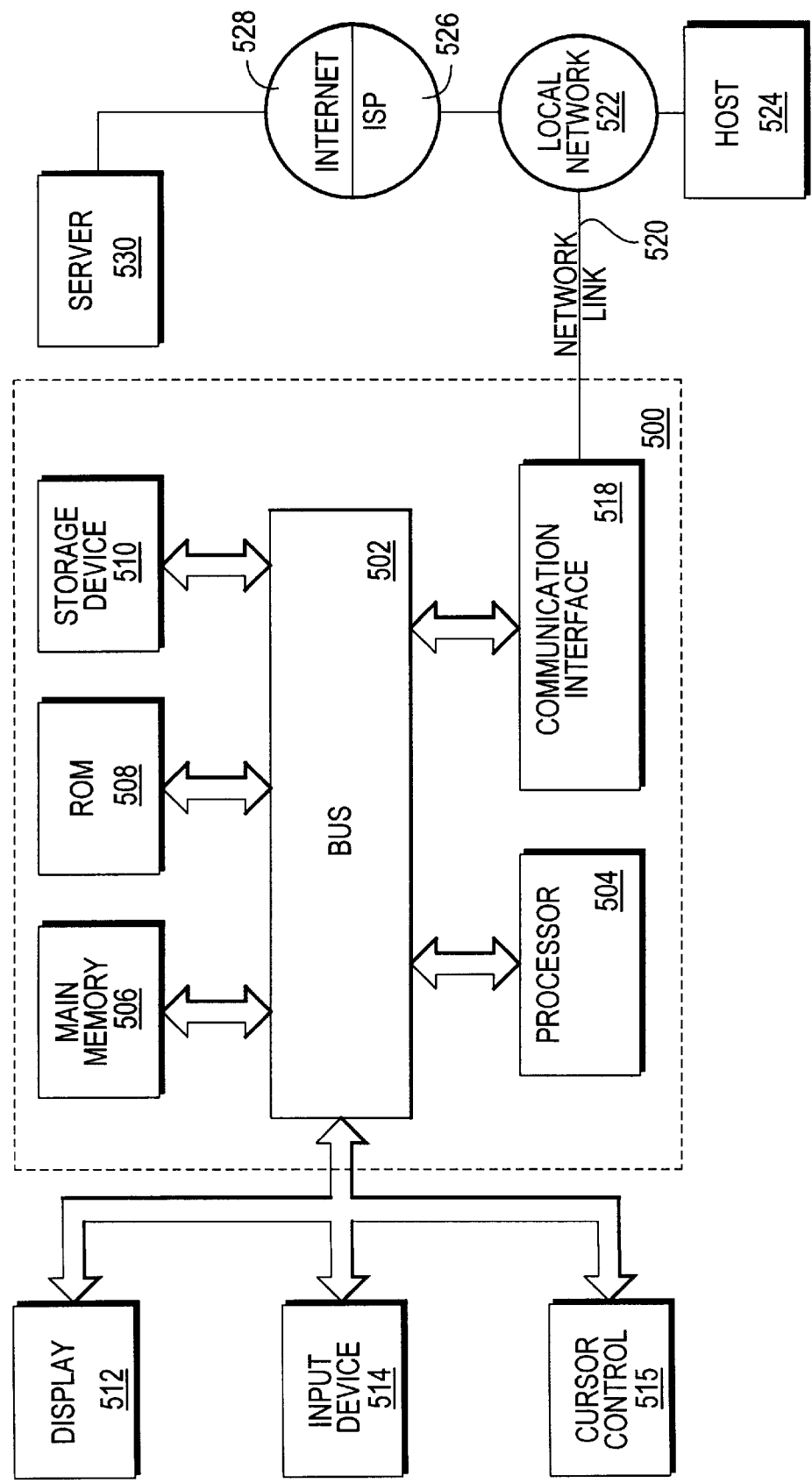
FIG. 5 is a block diagram of a computer system that can be used to operate the present invention.

FIG. 5 is a block diagram of a computer system 500 upon which an embodiment of the present invention can be implemented. In the preferred embodiment, computer 4 and server 8 have the structure of computer system 500.

Computer system 500 includes a bus 502 or other communication mechanism for communicating information, and a processor 504 coupled with bus 502 for processing information. Computer system 500 further comprises a random access memory (RAM) or other dynamic storage device 506 (referred to as main memory), coupled to bus 502 for storing information and instructions to be executed by processor 504. Main memory 506 also may be used for storing temporary variables or other intermediate information during execution of instructions by processor 504 Computer system 500 also comprises a read only memory (ROM) and/or other static storage device 508 coupled to bus 502 for storing static information and instructions for processor 504.

A data storage device 510 such as a magnetic disk or optical disk and its corresponding disk drive can be coupled to computer system 500. Computer system 500 can also be coupled via bus 502 to a display device 512, such as a cathode ray tube (CRT), for displaying information to a computer user. Computer system 500 further includes a keyboard 514 and a cursor control 516, such as a mouse.

Computer 500 also includes a communication interface 518 coupled to bus 502. Communication interface 518 provides a two-way data communication coupling to a network link 520 to a local network 522. For example, if communication interface 518 is an integrated services digital network (ISDN) card or a modem, communication interface 518 provides a data communication connection to the corresponding type of telephone line. If communication interface 518 is a local area network (LAN) card, communication interface 518 provides a data communication connection to a compatible LAN. Wireless links are also possible. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer 500 are exemplary forms of carrier waves transporting the information.

Computer 500 can send messages and receive data, including program code, through the network(s), network link 520 and communication interface 518. In the Internet example, a server 530 might transmit a requested code for an application program through Internet 528, ISP 526, local network 522 and communication interface 518. In accord with the invention, one such downloaded application could be the server voice control application described herein.

Processor 504 may execute the received code as it is received, and/or stored in storage device 510, or other non-volatile storage for later execution. In this manner, computer 500 may obtain application code in the form of a carrier wave.

The present invention is related to the use of computer system 500 to control a server using voice commands. According to one embodiment, control of a server using voice commands is performed by computer system 500 in response to processor 504 executing sequences of instructions contained in memory 506. Such instructions may be read into memory 506 from another computer-readable medium, such as data storage device 510. Execution of the sequences of instructions contained in memory 506 causes processor 504 to perform the process steps that will be described hereafter. In alternative embodiments, hard-wired circuitry may be used in place of or in combination with software instructions to implement the present invention. Thus, the present invention is not limited to any specific combination of hardware circuitry and software.

EXAMPLE APPLICATIONS, BENEFITS, AND EXTENSIONS

Accordingly, it is apparent that when using a voice channel with speech recognition in coordination with a World Wide Web Internet site, the presentation of information using the Web site is significantly improved over either existing interactive voice response (IVR) systems or Web sites that are accessed without a voice channel.

The invention disclosed herein has numerous benefits and applications. For example, one benefit is easily controlled information presentation. Generally, Web pages have a limited number of links that the user must follow, stepwise, to navigate through a system to a desired page of information. With the invention, a user can rapidly move to the desired information by a voice command.

The invention advantageously separates the control and presentation functions of information delivery and communication. It enables users to control the presentation of information and actions taken by the system in a simple and natural way.

In one application, the invention is used to generate Web pages containing graphs, charts, and other visual information that are displayed by the end user's Web browser in response to voice commands that tell the Web server what information is desired.

In another application, the invention is used to retrieve information from a relational database system or server that is coupled to a Web server. The end user issues voice commands to a Web application server, which converts the voice commands into a query in a query language understood by the database server. The Web server submits the query to the database server and receives records from the database that represent the results of the query. The Web server formats one or more Web pages using the data and transmits them to the end user's browser, which displays the data.

In yet another application, the invention is integrated with an online expert system or knowledge-based system. An end user connects to a Web application server that is coupled to a second server that runs expert system software. The expert system software is configured to receive inquiries, analyze the inquiries, and dispense advice. The Web server presents a prompting page to the end user that asks the end user to provide an inquiry in voice form. The end user establishes a voice connection to the expert system, for example, through a telephone call. The end user can make a request for advice in a flexible manner through speech. The speech input is transformed into a query that the expert system can recognize. The expert system analyzes the request and provides output that is formatted by the Web server into a Web page that has detailed graphic content. The Web server delivers the page to the end user's browser.

In a specific example of this type of application, the invention is used for voice control of a Web server, applied to the problem of booking travel arrangements such as for hotels, rental cars and common carriers. The expert system asks the user questions relating to their preferences in a flexible dialogue over the telephony portion of the application, while presenting appropriate images on the computer screen through the Web connection and browser software. Such images include seating diagrams for airplanes showing available seats, diagrams of cruise ships showing available accommodations, photographs of hotels and their grounds, maps, information on available rental cars, rate sheets, etc.

For instance, the system will ask the user for a desired destination. When the user responds "The Big Island of Hawaii," the system asks what category of hotel is desired. When the user answers "Luxury," the system presents images of several properties via the web browser. When the user selects one for further examination, the rate sheet is brought up on the user's screen. Once the user selects a class of room desired, a diagram of the hotel's rooms is brought up, showing the locations of that class of rooms, and for some properties, showing which rooms are still available. When the user selects a room, the system takes a credit card number, verifies and charges the card, and issues a confirmation number to the user.

In a catalog shopping application, the invention may be integrated with a Web application server that is coupled to a catalog application program or catalog database. When prompted by Web pages generated by the Web server or by voice prompts through the voice communication channel, the user states the type of merchandise desired. The Web server cooperates with the catalog application program to look up records describing the desired merchandise in a catalog database. The Web server and catalog application program cooperate to create Web pages that depict the merchandise, its features and benefits. The application program is configured to allow the end user to make refined queries to specify the merchandise in more detail.

A common advantage of using the invention in these applications is that use of buttons is not required. The applications do not require an end user to use the computer keyboard or mouse to navigate web pages; only voice commands are needed. Voice control is more convenient for many users.

In these and other applications, embodiments of the invention are expected to be less expensive than the cost of employing a human customer service representative. The invention can be configured to provide access to end users twenty-four hours per day, every day of the year. Access is worldwide through the Web. Rich visual information can be presented using HTML and its extensions such as VRML. The invention can be used with small computing devices that lack keyboards or a mouse, such as Personal Digital Assistants (PDAs). The invention also provides a faster way to navigate through a conventional Web site to reach desired information.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of controlling a remote server by a voice command issued from a location local to a client, comprising the steps of:

establishing a voice communication channel between said location local to said client and said remote server;

establishing a data communication channel associated with said voice communication channel between said client and said remote server;

receiving said voice command by said voice communication channel;

associating said voice command with an identifier of a server resource;

selecting said server resource based on said identifier and associating said identifier with a network address by identifying said identifier in a table of said remote server that maps identifiers to network addresses, and looking up said network address in said table; and delivering said server resource from said remote server to said client by said data communication channel.

2. The method recited in claim 1, wherein said step of associating said identifier further comprises the step of loading said server resource identified by said network address from a storage device coupled to said remote server.

3. A method of controlling a remote server by a voice command issued from a location local to a client, comprising the steps of:

establishing a voice communication channel between said location local to said client and said remote server;

establishing a data communication channel associated with said voice communication channel between said client and said remote server;

receiving said voice command by said voice communication channel;

associating said voice command with an identifier of a server resource;

selecting said server resource based on said identifier;

delivering said server resource from said remote server to said client by said data communication channel;

establishing a data communication channel between said client and said remote server configured to communicate data said client and said remote server; and establishing a second voice communication channel between said client and said remote server configured to communicate sound information including said voice command among said client and said remote server.

4. The method recited in claim 3, wherein said step of establishing a second voice communication channel includes establishing a telephone connection from said client to a voice recognizer that is coupled to said remote server.

5. The method recited in claim 3, wherein said step of establishing a second voice communication channel includes establishing a telephone connection from said client to an interactive voice response (IVR) system coupled to said remote server.

6. The method recited in claim 3 wherein said step of establishing a second voice communication channel includes establishing an Internet telephony connection from said client to a voice recognizer that is coupled to said remote server.

7. The method recited in claim 5 wherein said step of associating said voice command with an identifier further includes recognizing a natural language phrase in said voice command at said IVR system; transmitting said natural language phrase to said remote server; and transmitting a voice response from said IVR system to said client.

8. A method of controlling a remote server by a voice command issued from a location local to a client, comprising the steps of:

establishing a voice communication channel between said location local to said client and said remote server;

establishing a data communication channel associated with said voice communication channel between said client and said remote server;

receiving said voice command by said voice communication channel;

associating said voice command with an identifier of a server resource by converting a waveform of said voice command into a plurality of tokens, each token representing a parameter that describes a characteristic of said waveform, and converting said plurality of tokens into a resource identifier for a resource associated with the voice command; and selecting said server resource based on said identifier; and delivering said server resource from said remote server to said client by said data communication channel.

9. A method of controlling a remote server by a voice command issued from a location local to a client, comprising the steps of:

establishing a voice communication channel between said location local to said client and said remote server;

establishing a data communication channel associated with said voice communication channel between said client and said remote server;

receiving said voice command by said voice communication channel;

associating said voice command with an identifier of a server resource by at the client, receiving a waveform representation of said voice command;

converting said waveform representation of said voice command into a plurality of tokens that represent physical characteristics of said waveform representation;

delivering said plurality of tokens over said data communication channel to said remote server, and converting said plurality of tokens into a resource identifier for a resource associated with the voice command; and selecting said server resource based on said identifier; and delivering said server resource from said remote server to said client by said data communication channel.

10. A method of controlling a securities trading server from a client by voice, comprising the steps of:

establishing a data communication channel between said client and said remote server and a voice communication channel between a location local to said client and an interactive voice response (IVR) system coupled to said remote server;

receiving a voice command that contains a request to trade a security and a name of said security to be traded;

associating said request with one of said network addresses in a table of mappings of requests to network addresses stored in association with said remote server;

delivering a document identified by said one of said network addresses over said data communication channel to said client;

delivering a voice message from said IVR system to said client over said voice communication channel; and executing a trade of said security.

11. The method recited in claim 10, wherein the step of establishing a data communication channel includes the step of synchronizing said data communication channel to said voice communication channel.

12. A computer system providing voice control of a server from a client at a local point, comprising:

a data communication channel connecting said client and said remote server;

a voice communication channel coupled from said local point to said remote server, and synchronized to said data communication channel;

a plurality of documents stored in association with said remote server;

a table stored in association with said remote server and configured to associate network addresses of said documents with natural language phrases; and a sequence of instructions stored in memory coupled to said remote server and configured to cause said remote server to execute the steps of:

receiving said voice command by said voice communication channel;

associating said voice command with one of said natural language phrases in said table;

associating said one of said natural language phrases with one of said network addresses in said table;

delivering said document from said remote server to said client by said data communication channel; and delivering a voice message from said remote server to said local point, wherein said voice message is coordinated with said document.

13. The computer system recited in claim 12, wherein said voice communication channel is integrated with said data communication channel.

14. The computer system recited in claim 12, wherein said sequence of instructions further comprise instructions that cause said processor to carry out the step of processing said voice command using a speech recognition process to recognize said natural language phrase.

15. The computer system recited in claim 12, wherein said sequence of instructions further comprise instructions that cause said processor to carry out the steps of:

identifying said natural language phrase in a table of said remote server that maps natural language phrases to network addresses; and looking up said one of said network addresses in said table.

16. The computer system recited in claim 12, wherein said sequence of instructions further comprise instructions that cause said processor to carry out the step of loading said document identified by said network address from a storage device coupled to said remote server.

17. The computer system recited in claim 15, wherein said voice communication channel comprises a telephone connection from said client to a voice recognizer that is coupled to said remote server.

18. The computer system recited in claim 15, wherein said voice communication channel comprises a telephone connection from said client to an interactive voice response (IVR) system coupled to said remote server.

19. The computer system recited in claim 15 wherein voice communication channel comprises an Internet telephony connection from said client to a voice recognizer that is coupled to said remote server.

20. The computer system recited in claim 18 wherein said sequence of instructions further comprises instructions that cause said processor to execute the steps of:

recognizing said natural language phrase in said voice command at said IVR system;

transmitting said natural language phrase to said remote server; and transmitting a voice response from said IVR system to said client.

21. A computer-readable medium carrying one or more sequences of one or more instructions for controlling a remote server by a voice command issued from a location local to a client, the one or more sequences of one or more instructions including instructions which, when executed by one or more processors, cause the one or more processors to perform the steps of:

establishing a voice communication channel between said location local to said client and said remote server;

establishing a data communication channel associated with said voice communication channel between said client and said remote server;

receiving said voice command by said voice communication channel;

associating said voice command with an identifier of a server resource;

selecting said server resource based on said identifier and associating said identifier with a network address by identifying said identifier in a table of said remote server that maps identifiers to network addresses, and looking up said network address in said table; and delivering said server resource from said remote server to said client by said data communication channel.

22. The computer-readable medium as recited in claim 21, wherein said step of associating said identifier further comprises loading said server resource identified by said network address from a storage device coupled to said remote server.

23. A computer-readable medium carrying one or more sequences of one or more instructions for controlling a remote server by a voice command issued from a location local to a client, the one or more sequences of one or more instructions including instructions which, when executed by one or more processors, cause the one more processors to perform the steps of:

establishing a voice communication channel between said location local to said client and said remote server;

establishing a data communication channel associated with said voice communication channel between said client and said remote server;

receiving said voice command by said voice communication channel;

associating said voice command with an identifier of a server resource;

selecting said server resource based on said identifier;

delivering said server resource from said remote server to said client by said data communication channel;

establishing a data communication channel between said client and said remote server configured to communicate data said client and said remote server; and establishing a second voice communication channel between said client and said remote server configured to communicate sound information including said voice command among said client and said remote server.

24. The computer-readable medium as recited in claim 23, wherein said step of establishing a second voice communication channel includes establishing a telephone connection from said client to a voice recognizer that is coupled to said remote server.

25. The computer-readable medium as recited in claim 23, wherein said step of establishing a second voice communication channel includes establishing a telephone connection from said client to an interactive voice response (IVR) system coupled to said remote server.

26. The computer-readable medium as recited in claim 23, wherein said step of establishing a second voice communication channel includes establishing an Internet telephony connection from said client to a voice recognizer that is coupled to said remote server.

27. The computer-readable medium as recited in claim 25, wherein said step of associating said voice command with an identifier includes recognizing a natural language phrase in said voice command at said IVR system, transmitting said natural language phrase to said remote server, and transmitting a voice response from said IVR system to said client.

\* \* \* \* \*